United States Patent [19]

Tzeng

[11] Patent Number: 5,459,784
[45] Date of Patent: Oct. 17, 1995

[54] DUAL-TONE MULTIFREQUENCY (DTMF) SIGNALLING TRANSPARENCY FOR LOW-DATA-RATE VOCODERS

[75] Inventor: Forrest F. Tzeng, Rockville, Md.

[73] Assignee: Comsat Corporation, Bethesda, Md.

[21] Appl. No.: 952,258

[22] Filed: Sep. 28, 1992

[51] Int. Cl.$^6$ .................................................. H04M 3/22
[52] U.S. Cl. ........................ 379/386; 379/283; 379/351
[58] Field of Search ................................. 379/386, 281, 379/282, 283, 372, 350, 351, 353; 340/825.73; 328/136, 137, 138, 139

[56] References Cited

U.S. PATENT DOCUMENTS

| | | | |
|---|---|---|---|
| 4,042,787 | 8/1977 | Richards | 379/283 X |
| 4,042,788 | 8/1977 | Richards | 379/283 X |
| 4,042,790 | 8/1977 | Richards | 379/351 |
| 4,191,862 | 3/1980 | Hughes | 379/283 |
| 4,206,323 | 6/1980 | Padgett et al. | 379/386 |
| 4,211,897 | 7/1980 | Ichikawa et al. | 379/283 |
| 4,354,248 | 10/1982 | Conger et al. | 379/386 |
| 4,440,988 | 4/1984 | Heatherington | 379/98 |
| 4,571,462 | 2/1986 | Janssen | 379/361 |
| 4,608,686 | 8/1986 | Barsellotti | 379/94 X |
| 4,689,760 | 8/1987 | Lee et al. | 379/386 |
| 4,740,963 | 4/1988 | Eckley | 370/110.1 |
| 4,782,523 | 11/1988 | Galand et al. | 379/386 |
| 4,853,958 | 8/1989 | Rabipour et al. | 379/386 |
| 4,907,262 | 3/1990 | Kwun | 379/281 |
| 4,908,825 | 3/1990 | Vea | 379/283 |
| 4,922,528 | 5/1990 | Hubert et al. | 379/386 |
| 4,932,062 | 6/1990 | Hamilton | 395/2.42 |
| 5,023,906 | 6/1991 | Novas | 379/386 |
| 5,073,940 | 12/1991 | Zinser et al. | 395/2.35 |
| 5,097,507 | 3/1992 | Zinser et al. | 381/31 |
| 5,103,474 | 4/1992 | Stoodley et al. | 379/58 |
| 5,109,403 | 4/1992 | Sutphin | 379/59 |
| 5,119,412 | 6/1992 | Atallah | 379/102 |
| 5,121,391 | 6/1992 | Paneth et al. | 370/95.1 |
| 5,131,027 | 7/1992 | Hird et al. | 379/112 |
| 5,144,626 | 9/1992 | Funatsu et al. | 379/283 |
| 5,319,703 | 6/1994 | Drory | 379/351 |
| 5,325,427 | 6/1994 | Dighe | 379/386 |

OTHER PUBLICATIONS

"Line Spectrum Pair (LSP) and Speech Data Compression" Frank V. Soong et al. 1984 IEEE Acoustics, Speech, and Signal Processing Society.

"Quantizer Design in LSP Speech Analysis–Synthesis" IEEE Journal on Selected Areas in Communications, vol. 6, No. 2 Feb. 1988 Noboru Sugamura and Nariman Farvardin pp. 432–440.

"Session VIII: Fully Integrated Analog Filters; An Integrated Dual–Tone Multi–Frequency Decoder" Michael J. Callahan Jr. and Harold L. Davis 1978 IEEE Int'l Solid State Circuits Conference pp. 86–89.

"Integrated DTMF Receiver" Michael J. Callahan, Jr. IEEE Transactions on Communications, vol. –27 No. 2, Feb. 1979 pp. 343–348.

(List continued on next page.)

Primary Examiner—Jeffery A. Hofsass
Assistant Examiner—Scott L. Weaver
Attorney, Agent, or Firm—Sughrue, Mion, Zinn, Macpeak & Seas

[57] ABSTRACT

Multifrequency signals are detected in a received signal by extracting filter coefficients from the received signal, generating line spectrum frequency (LSF) parameters from the filter coefficients, and processing the LSF parameters to identify multifrequency signals. The LSF parameters are first examined to see if the lowest frequency represented by the LSF parameters is below a predetermined frequency, e.g., 600 Hz, and if so it is determined that the signal is not a multifrequency signal. The parameters are next examined to see if there are exactly two sharp frequency spectrum peaks, with a sharp peak being defined by two consecutive LSF frequencies separated by less than some predetermined frequency range, e.g., 60 Hz. Assuming there are two peaks, the locations of the peaks are examined to see if they correspond to the possible tone pairs, thereby identifying a particular multifrequency tone.

20 Claims, 2 Drawing Sheets

OTHER PUBLICATIONS

Argrawal, R. C. et al, "Multiplierless Implementation of MF/DTMF Receivers", *IEEE Transaction of Communications*, Jul. 1984, pp. 839–847.

Valenzuela, R. A., "Efficient DSP Based Detection of DTMF Tones", *IEEE Global Telecommunications* Conference, 1990, pp. 1717–1721.

Gay, S. L. et al, "Algorithms for Multi–Channel DTMF Detection for the WE/DSP32 Family", *IEEE IEEE Intern. Conf. Acoustics, Speech, and Signal Processing*, 1989, pp. 1134–1137.

Callahan, Jr., M. J., "Integrated DTMF Receiver", *IEEE Transactions on Communications*, Feb. 1979, pp. 343–348.

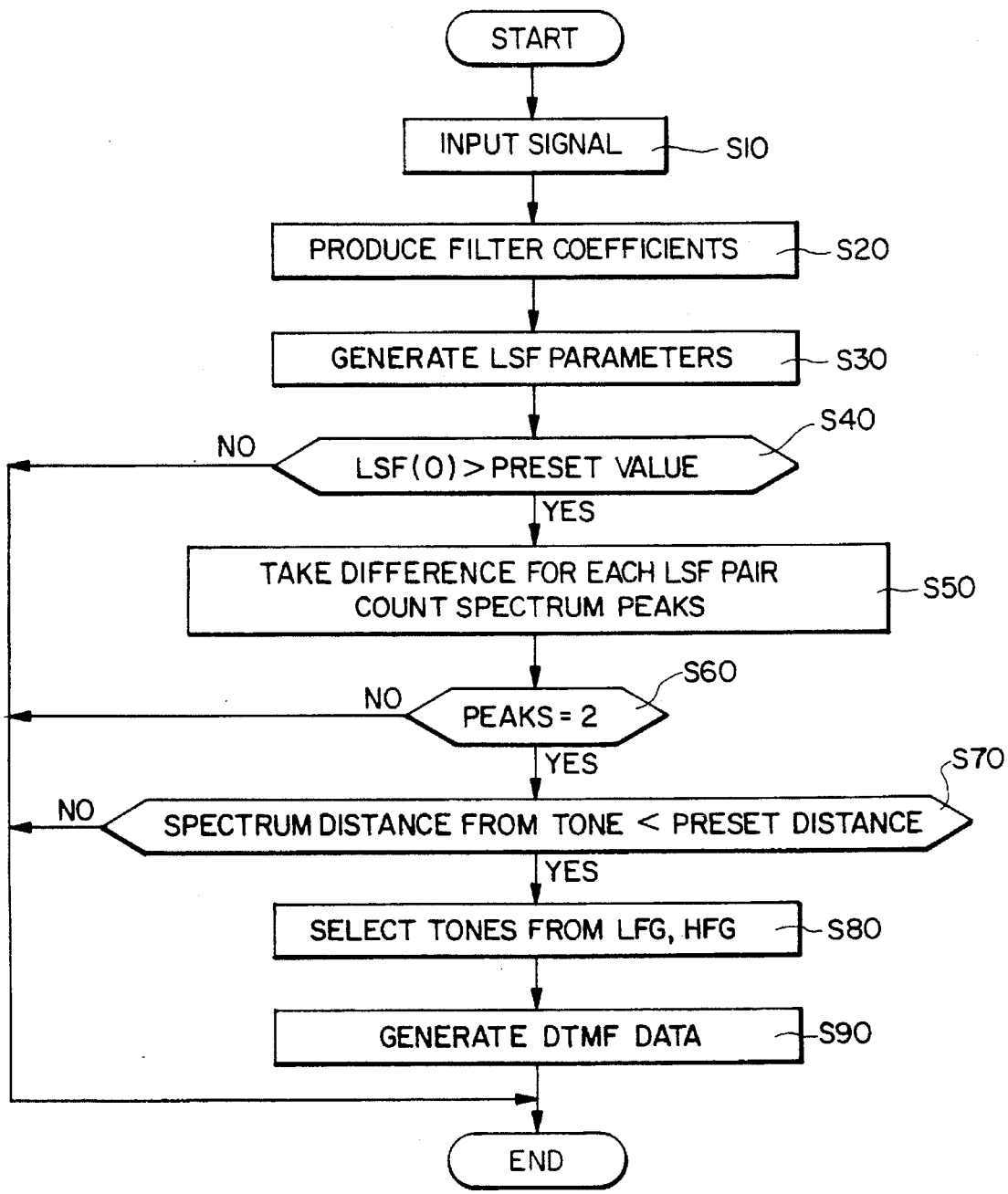

5,459,784

DUAL-TONE MULTIFREQUENCY (DTMF) SIGNALLING TRANSPARENCY FOR LOW-DATA-RATE VOCODERS

FIELD OF THE INVENTION

The present invention is directed to the field of telephone communications. In particular, the invention is directed to a dual-tone multifrequency (DTMF) signal detector for use in vocoders and the like that allow public-switched telephone network (PSTN) signals to be used by private-branch exchanges (PBX) and the like.

BACKGROUND OF THE INVENTION

In recent years, speech coding research has focused on reducing data width of speech signals while retaining voice quality, signal strength (robustness) under noisy conditions, and minimizing both coding delay and complexity. Vocoders have been developed to transmit speech signals in a coded manner to reduce the transmission bandwidth which would otherwise be required. As disclosed in U.S. Pat. No. 4,310,721, which is herein incorporated by reference, vocoders are used to analyze the characteristics of a speech signal for encoding, or to synthesize a coded signal and reconstruct an original speech signal. Vocoders implemented with digital signal processor (DSP) technology can be used to greatly reduce the complexity of the vocoder system.

However, the speech coding research resulting in improved vocoder systems has often neglected one specific issue, especially for low-data-rate (e.g., 4.8 kbps and below) vocoder implementations. This issue involves the ability to transfer dual-tone multifrequency (DTMF) signals through the vocoder. The issue is referred to as "DTMF signalling transparency." The issue is significant in that DTMF signalling is required for touch-tone applications in a public-switched telephone network (PSTN) and a private-branch exchange (PBX), as well as, applications such as remote RF signalling, computer access by remote telephone instruments, and many other applications. Since the DTMF signals consist of two simultaneously transmitted audio frequency tones, conventional vocoders have been able to transmit DTMF signals. However, the performance of such vocoders is rather poor, especially in vocoders based on voiced unvoiced characteristics of speech. The poor performance of most conventional vocoders stems from the fact that DTMF signalling transparency has never been a design goal.

The major reason for the lack of design consideration, at least for vocoders operating at 4.8 kbps and less, is that low-data-rate vocoders attempt to exploit speech characteristics (including the linear predictive filter modeling) as much as possible for data compression. As a result, the fidelity of the DTMF signals cannot be well preserved.

Some conventional attempts have been made to provide DTMF signal transparency. For example, one technique involves the use of an external DTMF signal detector 30, as shown in FIG. 3. This detector 30 determines whether or not a DTMF signal appears on an input signal line. If the DTMF signal is detected, the signal line is switched so as to by-pass the vocoder 34. The signal line is fed into a DTMF regenerator 32 so that the detected DTMF signal can then be regenerated. An obvious drawback of this conventional technique is that additional hardware such as the DTMF detector 30 and switching device 33 are required. Additional hardware of this type increases the system cost and requires more space for implementation.

Another technique of providing DTMF signal transparency is to provide the vocoder with a DSP detection program that allows software detection of the DTMF signal within the vocoder. Although this technique eliminates the need for the external hardware required in the previously described conventional technique, previous DSP detection programs were extremely complex and required high computational capabilities. Thus, for many vocoder designs, the conventional DTMF detection schemes were not viable because the vocoders were already designed to run close to the limit of the DSP computing power.

SUMMARY OF THE INVENTION

The present invention overcomes the above and other problems by providing a simple dual-tone multifrequency (DTMF) detector that may be implemented by a digital signal processor (DSP) in a conventional vocoder. In particular, the present invention relies on the use of an all-pole linear predictive spectrum filter, as described in a publication entitled "Digital Processing of Speech Signals," by L. R. Rabiner and R. W. Schafer, chapter 8 (1978), combined with an LSF parameter representation provided by the vocoder, as described in a publication entitled, "Low-Bit-Rate Speech Encoders Based on Line-Spectrum Frequencies (LSFs)," by G. S. Kang and L. J. Fransen, both of which publications are herein incorporated by reference.

Most vocoders operating at 16 kbps and below almost exclusively utilize an all-pole linear predictive spectrum filter to analyze and transmit speech signals. The all-pole filter coefficients extracted from the input signal are used to compute LSF parameters. Given the LSF parameters, the present invention utilizes three computationally simple conditions to determine and identify DTMF signals appearing on the input signal line.

By employing the present invention in a conventional vocoder, DTMF signalling transparency can be achieved without incurring the cost of external hardware, and without requiring additional computational power of the DSP of the vocoder.

The above and other objects, features and advantages of the invention are disclosed in or will be apparent from the following description of preferred embodiments.

BRIEF DESCRIPTION OF THE DRAWINGS

The preferred embodiments are described with reference to the appended drawings in which:

FIG. 2 illustrates a flow chart representing the operational flow of the present invention.

DESCRIPTION OF THE PREFERRED EMBODIMENTS

Although the present invention will be described in conjunction with a digital signal processor (DSP) embodied in a vocoder, it should be noted that the present invention and the advantages derived therefrom are not to be limited by the illustrated embodiments.

Figure 1:
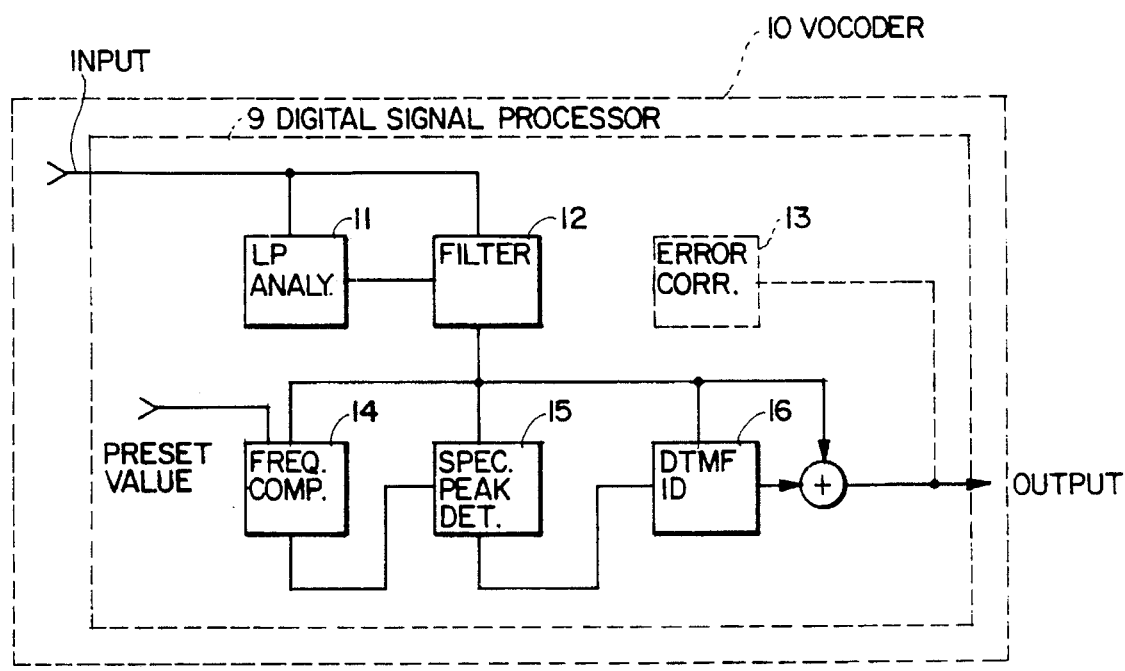
FIG. 1 illustrates a vocoder employing a dual-tone multifrequency (DTMF) detector in accordance with the present invention.
Figure 3:
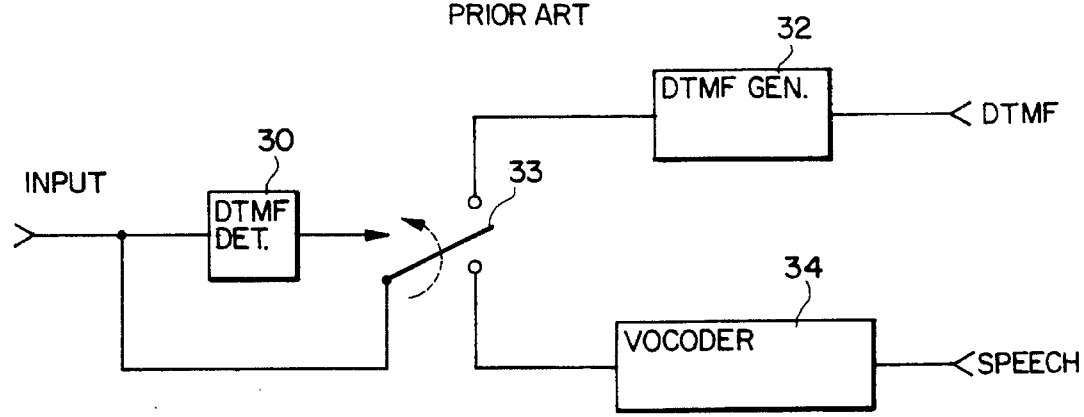
FIG. 3 illustrates a conventional vocoder system employing an external DTMF detector.

A vocoder incorporating the present invention is illustrated in FIG. 1. As shown, the vocoder incorporates a number of different elements that may be implemented by a single DSP as follows. While the illustration of FIG. 1 shows various circuits for performing different functions, this is for ease of discussion only, and in the preferred embodiment many or all of these functions would all be performed by DSP, in which case the various components shown in FIG. 1 would actually be functional blocks within the processor.

A linear predictive analyzer 11 is provided to analyze an input signal and generate filter coefficients for an all-pole linear predictive spectrum filter 12. The all-pole filter 12 generates LSF parameters (e.g., LSF[0] . . . LSF[9] for a tenth-order filter structure) for representing a transfer function that closely resembles the gross spectral shape of the input signal. The LSF parameter representation has been found to be the most suitable in terms of quantization and interpolation properties.

A frequency comparison 14 is used to compare the LSF parameters with a preset value (e.g., 600 Hz). A spectrum peak detection 15 is used to determine sharp spectrum peaks from the LSF parameters. A dual-tone multifrequency (DTMF) identification 16 is used to identify DTMF tones from the input signal based on the sharp spectrum peaks and to output identification data representative thereof. A DTMF generator (not shown) is provided at the receive side for regenerating the input DTMF signal as identified by the DTMF identification 16.

The cooperative relationship among the above described elements in accordance with the present invention will now be described with reference to the flow chart shown in FIG. 2.

In accordance with the present invention, an input signal appearing at the input terminal of the vocoder 10 (FIG. 1) is input as a telephone signal to linear predicative analyzer 11, step S10. As is well known in the art, the input signal may include DTMF signals, silence gaps, speech and other signals for use on a public switching network (PSTN), private branch exchange (PBX), or the like. The input signal is typically broken down into consecutive fixed-size segments or frames (e.g., 20–30 ms in length) within the analyzer 11, and well-known linear prediction analysis is performed to extract the all-pole filter coefficients. The linear prediction analysis may be the well-known autocorrelation method, or any other prediction analysis method, such as that described in U.S. Pat. No. 5,097,507, which is herein incorporated by reference, known to those of ordinary skill in the art. As such methods are common in the pertinent art a detailed discussion is omitted herein.

In step S20, the linear prediction analyzer 11 extracts all-pole filter coefficients from the input signal for use in the all-pole linear predictive spectrum filter 12. Although the present invention will be described in terms of a tenth-order spectrum filter, the present invention is not limited to such a filter. In step S30, LSF parameters are computed from the filter coefficients and denoted as LSF[0] . . . LSF[9]. Given the LSF parameters, the present invention can easily distinguish DTMF input signals from speech input signals.

In accordance with the invention, a frequency comparison 14 compares the lowest LSF frequency parameter (LSF[0]) with a preset value (e.g., 600 Hz), in step S40. Where the LSF frequency is less than or equal to the preset value, the input signal represents a speech signal. (This step alone eliminates 85% of the possibility that a speech signal is detected as a DTMF signal.) If, however, the LSF frequency is larger than the preset value, then the spectrum peak detection 15 receives the LSF parameters.

The spectrum peak detection 15 is used to detect sharp spectrum peaks in the input signal. Each spectrum peak is represented by two closely spaced LSF parameters. The sharpness of the spectrum peak is defined using a predetermined value (e.g., 60 Hz). More specifically, the spectrum peak detection computes the difference of each consecutive LSF pair (e.g., LSF[0] and LSF[1]; LSF[1] and LSF[2]; . . . LSF[8] and LSF[9]), in step S50. If a difference is less than the predetermined value, than a spectrum peak is identified. Also in step S50, the number of spectrum peaks identified is, counted. If, in step S60, the number of spectrum peaks identified is equal to two, then a DTMF signal might be identified. Where the number is not equal to two, the input signal does not represent a DTMF signal.

In some cases, three consecutive LSF parameters (e.g., LSF[i−1], LSF[i], LSF[i+1]) are close together, and the difference between LSF[i−1] and LSF[i], and the difference between LSF[i] and LSF[i+1] are both less than 60 Hz. In these cases, only one spectrum peak should actually be determined, and the two LSF values with the smaller difference are identified as the corresponding LSF pair.

In step S70, the DTMF identification 16 determines the tones making up the DTMF signal. In particular, the DTMF identification 16 determines whether the LSF pair (denoted as LSF[1][0],LSF[1][1], for convenience) making up the first spectrum peak is within a preset distance (e.g., 60 Hz) from one of the tones in the DTMF low-frequency group (LFG). (As is well known in the art, the DTMF signal is composed of two simultaneously transmitted signals: a first one taken from a low-frequency group (LFG) of signals having frequencies between 697 and 941 Hz, and a second one taken from a high-frequency group (HFG) of signals having frequencies between 1209 and 1633 Hz.) Similarly, the identification 16 determines whether the LSF pair (denoted as LSF[2][0],LSF[2][1]) associated with the second spectrum peak is within the same preset distance of a tone from the HFG.

If the two LSF pairs are within the preset distance, the DTMF identification 16 detects the one LFG tone which is closest to the first LSF pair (i.e., LSF[1][0],LSF[1][1]). Similarly, the identification 16 detects the one HFG tone that is closest to the second LSF pair (i.e., LSF[2][0],LSF[2][1]). In the preferred embodiment, the closest tone in each group is determined by computing a first difference value between a given tone in the group (e.g., LFG) and LSF[1][0], and computing a second difference value between the same tone and LSF[1][1]. The smaller value of the first and second difference values thus computed is taken as the distance for determining the closest tone in that group (e.g., LFG) relative to the LSF pair.

In step S90, DTMF identification 1.6 outputs data representative of a DTMF signal based on the two tones from the LFG and HFG identified. The identified DTMF signal generated is one of sixteen possible DTMF signals, as shown in the following Table:

| DTMF | LOW FREQUENCY GROUP (LPG) | | | | HIGH FREQUENCY GROUP (HFG) | | | |
| --- | --- | --- | --- | --- | --- | --- | --- | --- |
| | 697 | 770 | 852 | 941 | 1209 | 1336 | 1477 | 1633 |
| 1 | X | | | | X | | | |
| 2 | X | | | | | X | | |
| 3 | X | | | | | | X | |
| 4 | | X | | | X | | | |

-continued

| DTMF | LOW FREQUENCY GROUP (LPG) | | | | HIGH FREQUENCY GROUP (HFG) | | | |
|---|---|---|---|---|---|---|---|---|
| | 697 | 770 | 852 | 941 | 1209 | 1336 | 1477 | 1633 |
| 5 | | X | | | | X | | |
| 6 | | X | | | | | X | |
| 7 | | | X | | X | | | |
| 8 | | | X | | | X | | |
| 9 | | | X | | | | X | |
| 0 | | | | X | | X | | |
| * | | | | X | X | | | |
| # | | | | X | | | X | |
| A | X | | | | | | | X |
| B | | X | | | | | | X |
| C | | | X | | | | | X |
| D | | | | X | | | | X |

A DTMF generator at the receive side (not shown) regenerates the DTMF signals based on the identification data from the vocoder and sets the signal levels of the regenerated DTMF signals at the nominal levels for accurate reception (e.g., LFG signals are output at −6 dBm, HFG signals are output at −4 dBm). In addition, the DTMF generator sets the tonegap duration by ensuring that the minimum duration requirement of at least two frames (e.g., 40 to 60 ms) is met. More specifically, when the frame status is changed (e.g., the previous frame was detected as a speech signal and the current frame was detected as a DTMF signal, or vice versa), the DTMF generator determines if the previous frame status has remained the same for at least two frames. If the previous frame status has been the same for that length of time, then the DTMF generator accepts the frame status change. If not, the change is rejected and the previous frame status remains for at least another frame length.

In another embodiment of the present invention, the vocoder is provided with an error correction circuit 13 (FIG. 1) that ensures robust operation of the vocoder under noisy channel conditions. In accordance with this embodiment of the invention, the critical DTMF information is protected by the error correction circuit 13. More specifically, two redundant bits are provided to protect a single bit (per frame) which specifies a DTMF signal or a speech frame. For a single-bit error correction, the error correction circuit 13 determines an error using a majority vote technique, as is well known in the art. For a DTMF frame, a four-bit word is necessary to specify the particular tone-pair (out of a possible 16). Since all of the data bits in the current frame are available, five 4-bit words are used to provide a 2-word error correction by majority vote. It should be appreciated that different levels of error protection can be provided depending on the specific vocoder employed when the present invention is reduced to practice.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention. For example, since the present invention uses only unquantized LSF parameters (i.e., no specific quantization scheme is required), the invention can be easily applied to any vocoder which employs an all-pole spectrum filter with LSF parameter representation, including those operating at low-data rates such as 2.4/1.2 kbps and below.

Furthermore, it should be appreciated that the DTMF signalling transparency described above can be readily applied to a multifrequency signaling system, known as the "two-out-of-six" frequency signalling system. In such a system, the present invention can be adapted by making minor parameter modifications corresponding to the frequency changes between the DTMF and the MF frequency groups. The six frequencies used in the MF system are 700, 900, 1100, 1300, 1500, and 1700 Hz. Thus, since the frequency differences in the MF signalling system are larger than those in the DTMF signalling system (shown in the Table above), the detection parameters can be selected easily using the principles of the present invention.

What is claimed is:

1. A multifrequency detector for detecting a multifrequency signal from an input signal, comprising:

linear predictive analysis means for producing a set of linear prediction filter coefficients based on said input signal;

linear predictive parameter generating means, using said set of said linear prediction filter coefficients produced by said linear predictive analysis means, for generating line spectral frequency (LSF) parameters representing said input signal;

frequency comparison means receiving the lowest LSF parameter of said LSF parameters generated by said parameter generating means and comparing said lowest LSF parameter with a preset value;

spectrum peak detection means for taking a difference between each consecutive pair of said LSF parameters, and for identifying a spectrum peak for each respective difference which is less than a predetermined frequency to thereby identify all spectrum peaks;

multifrequency identification means, responsive to an identification of at least one of said spectrum peaks, for detecting whether a first spectrum peak of said at least one of said spectrum peaks is within a preset distance of one of a plurality of multifrequency tones, wherein said multifrequency identification means, responsive to a detection that said first spectrum peak is within said preset distance of said at least one of said multifrequency tones, further outputting identification data identifying a respective tone of said multifrequency tones that is the closest tone to said first spectrum peak as said multifrequency signal from said input signal.

2. The multifrequency detector of claim 1, wherein said multifrequency signal is a dual-tone multifrequency (DTMF) signal, and wherein said multifrequency tones include a low frequency group having frequencies between 697 and 941 Hz, and a high frequency group having frequencies between 1209 and 1633 Hz.

3. The multifrequency detector of claim 2, wherein all of said linear predictive analysis means, linear predictive parameter generating means, frequency comparison means, spectrum peak detection means and multifrequency identification means comprise a digital signal processor in a vocoder, wherein said preset value is 600 Hz, wherein said predetermined frequency is 60 Hz, and wherein said preset distance is 60 Hz.

4. The multifrequency detector of claim 3, wherein said input signal comprises a telephone signal from a public-switched telephone network (PSTN).

5. The multifrequency detector of claim 1, further comprising means for transmitting said identification data to a receive end for use in regenerating the detected multifrequency signal.

6. A dual-tone multifrequency (DTMF) detector in a vocoder for detecting a DTMF signal from an input signal, which DTMF signal is composed of a low tone signal from a first group of low frequency tones and a high tone signal from a second group of high frequency tones, said DTMF detector comprising:

linear predictive analysis means for producing a set of linear prediction filter coefficients based on said input signal;

linear predictive parameter generating means, using said set of said linear prediction filter coefficients produced by said linear predictive analysis means, for generating line spectrum frequency (LSF) parameters representing said input signal;

frequency comparison means for receiving the lowest LSF parameter of said LSF parameters generated by said parameter generating means and comparing said lowest LSF parameter with a preset value;

spectrum peak detection means for taking a difference between each consecutive pair of said LSF parameters, and identifying a spectrum peak for each respective difference which is less than 60 Hz to thereby identify all spectrum peaks; and DTMF identification means, responsive to detection of only two of said spectrum peaks, for detecting whether a first spectrum peak of said spectrum peaks is within a preset distance of one of said low frequency tones in said first group and whether a second spectrum peak of said spectrum peaks is within said preset distance of one of said high frequency tones in said second group, said DTMF identification means, responsive to a determination that both said first and said second spectrum peaks are within said preset distance of respective ones of said first and said second groups further identifying said respective ones of said first and said second groups having respective minimum separations from said first and said second spectrum peaks, respectively, are identified as a DTMF signal pair from said input signal, and for generating an identification signal from said vocoder identifying said DTMF signal pair.

7. The multifrequency detector of claim 6, further comprising means for transmitting said identification signal generated from said vocoder identifying said DTMF signal pair to a receive end for use in regenerating the identified DTMF signal pair.

8. A method of detecting a multifrequency signal in an input signal, said multifrequency signal comprising plural tones from at least one group of predetermined tones, the method comprising the steps of:

analyzing said input signal using linear predictive analysis to thereby produce a set of linear prediction filter coefficients;

generating a series of line spectral frequency (LSF) parameters from said filter coefficients;

determining the lowest LSF parameter and comparing said lowest LSF parameter with a preset value;

in response to a detection that said lowest LSF parameter is larger than said preset value, taking a difference between each consecutive LSF pair of said LSF parameters, and identifying a spectrum peak for each respective difference which is less than a predetermined frequency to thereby identify all spectrum peaks;

in response to an identification of at least one of said spectrum peaks, detecting whether a first spectrum peak of said spectrum peaks is within a preset distance of one of said predetermined tones;

in response to a detection that said first spectrum peak is within said preset distance of at least one of said predetermined tones, identifying a respective one of said predetermined tones that is closest to said first spectrum peak as said multifrequency signal; and in response to identifying said multifrequency signal, generating an output signal corresponding to said multifrequency signal identified in said identifying step.

9. The method of detecting a multifrequency signal as recited in claim 8, wherein said predetermined tones are selected from frequencies between 700 and 1700 Hz.

10. The method of detecting a multifrequency signal as recited in claim 9, wherein said input signal and said output signal are digital signals.

11. The method of detecting a multifrequency signal as recited in claim 10, wherein said [said] input signal is a telephone signal from a private-branch exchange (PBX).

12. In a dual-tone multifrequency (DTMF) detector for detecting a DTMF signal, which DTMF signal is composed of a first tone signal from a first group of low frequency tones and a second tone signal from a second group of high frequency tones, said DTMF detector for use in a vocoder having a digital signal processor (DSP) operating at speeds below 16 kbps, said vocoder employing linear predictive analysis means to produce a set of linear prediction filter coefficients for an linear predictive parameter generating means, a method of detecting a DTMF signal comprising the steps of:

inputting a telephone signal into said vocoder;

analyzing said input telephone signal using said linear predictive analysis means to thereby produce said filter coefficients;

generating a series of line spectrum frequency (LSF) parameters from said filter coefficients;

determining the lowest LSF parameter of said LSF parameters and comparing said lowest LSF parameter with a preset value;

in response to a detection that said lowest LSF parameter is larger than said preset value, taking a difference between each consecutive LSF pair of said LSF parameters, and identifying a spectrum peak for each respective difference which is less than 60 Hz to thereby identify all spectrum peaks;

in response to identification of only two of said spectrum peaks, detecting whether a first spectrum peak of said spectrum peaks is within a preset distance of one of said low frequency tones in said first group and whether a second spectrum peak of said spectrum peaks is within said preset distance of one of said high frequency tones in said second group;

in response to a detection that both said first and said second spectrum peaks are within said preset distance of respective said ones of said low frequency tones and said high frequency tones, respectively, identifying a first tone in said first group and a second tone in said second group which are respectively closest to said first and said second spectrum peaks as said first tone signal and said second tone signal defining a DTMF signal pair appearing in said telephone signal; and in response to identifying said DTMF signal pair, transmitting DTMF data representing said identified DTMF signal pair from said vocoder.

13. A method of detecting multifrequency signals in a received signal, said method comprising the steps of:

extracting filter coefficients from said received signal;

generating line spectrum frequency (LSF) parameters from said filter coefficients; and processing said LSF parameters to identify multifrequency signals in said received signal based on spacing between pairs of LSF parameters.

14. The method as recited in claim 13, wherein said processing step comprises identifying if the lowest frequency represented by said LSF parameters is below a predetermined frequency, and if so, identifying that said received signal is not one of said multifrequency signals.

15. The method as recited in claim 14, wherein said predetermined frequency is 600 Hz.

16. The method as recited in claim 13, wherein said processing step further comprises counting sharp frequency spectrum peaks in a frequency spectrum representative of said received signal.

17. The method as recited in claim 16, wherein said counting step comprises the steps of:

comparing consecutive pairs of said LSF parameters to determine respective frequency differences therebetween; and determining that one of said sharp frequency spectrum peaks exists when a respective one of said frequency differences is less than a predetermined value.

18. The method as recited in claim 17, wherein each of said sharp frequency spectrum peaks is associated with a pair of said LSF parameters representing respective first and second frequencies, and wherein said step of processing said LSF parameters further comprises the steps of:

determining if respective said first and said second frequencies representing a first sharp frequency spectrum peak are within a predetermined frequency range of one of a plurality of frequencies associated with said multifrequency signals; and determining if respective said first and said second frequencies representing a second sharp frequency spectrum peak are within said predetermined frequency range of another of said frequencies associated with said multifrequency signals.

19. The method as recited in claim 13, wherein said received signal is segmented into a plurality of successive frames, wherein said processing step is performed on each of said frames, wherein each of said frames has one of a first state or a second state depending on whether said processing step identifies one of said multifrequency signals or another signal, and wherein said processing step further changing from a first one of said first and said second states to a second one of said first and said second states when at least two consecutive preceding ones of said frames are in said first one of said first and said second states.

20. The method as recited in claim 13, wherein said multifrequency signals are dual tone multifrequency (DTMF) signals.

* * * * *